UNITED STATES PATENT OFFICE.

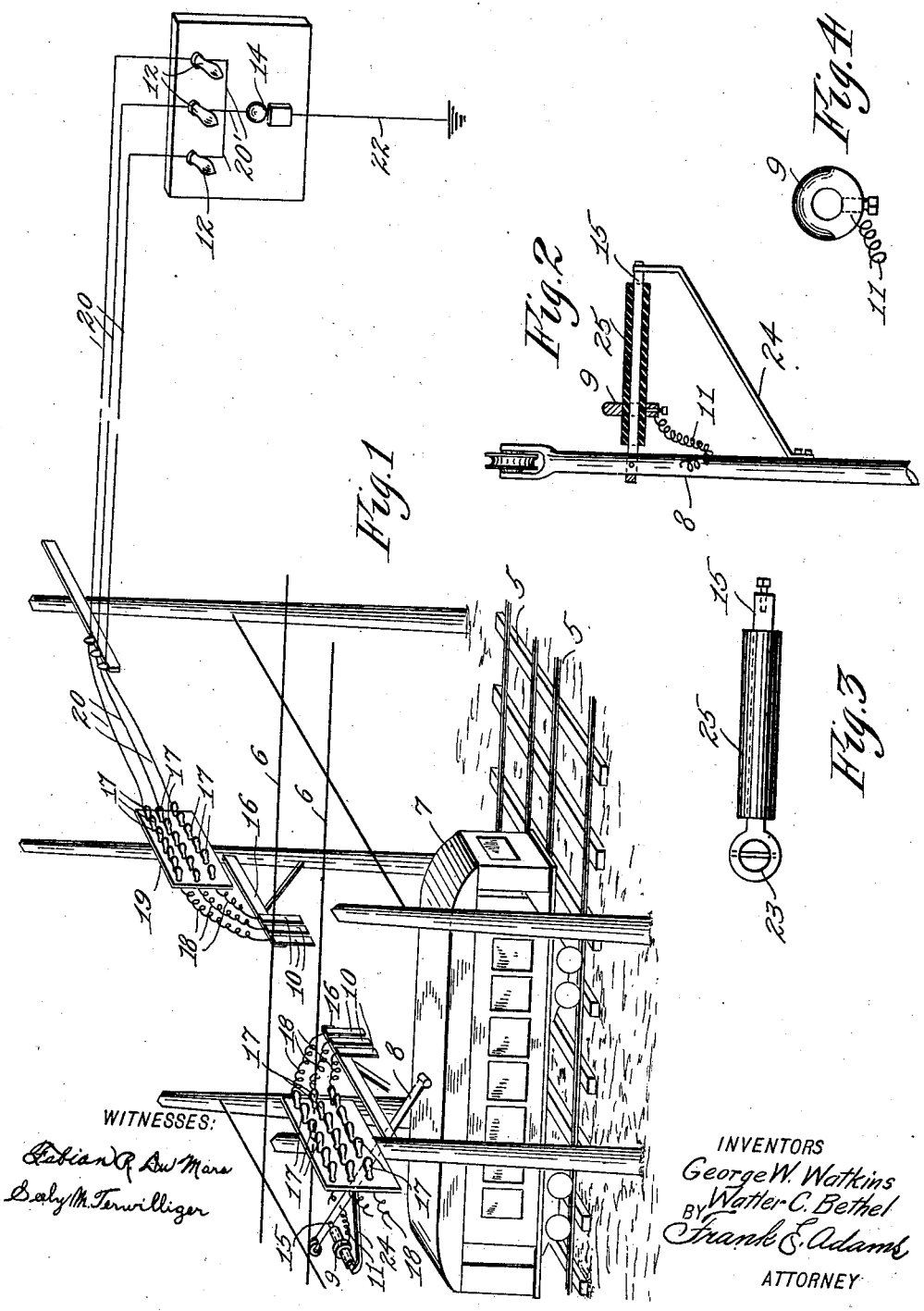

GEORGE WASHINGTON WATKINS AND WALTER CHAPMAN BETHEL, OF SEATTLE, WASHINGTON; SAID WATKINS ASSIGNOR TO JOHN T. BETHEL, OF SEATTLE, WASHINGTON.

ELECTRIC SIGNALING APPARATUS.

No. 828,446.  Specification of Letters Patent.  Patented Aug. 14, 1906.

Application filed May 28, 1903. Renewed January 22, 1906. Serial No. 297,352.

*To all whom it may concern:*

Be it known that we, GEORGE WASHINGTON WATKINS and WALTER CHAPMAN BETHEL, citizens of the United States of America, and residents of the city of Seattle, in the county of King and State of Washington, have invented certain new and useful Improvements in Electric Signaling Apparatus, of which the following is a specification.

Our invention relates to improvements in electric signaling apparatus for electric railways, and has special reference to apparatus of this nature which is especially adapted for embodiment with street-railway lines operating by the trolley system.

Among numerous objects attained by this invention and readily understood from the following specification and accompanying drawings, included as a part thereof, is the production of simplified, inexpensive, and efficient electric signaling apparatus embodying essential features of adaptability, utility, and adjustability which materially reduce the cost of installing a signaling system of this nature on established electric lines, insures positive operation of the signal-circuits from the line-circuit, and renders the cars interchangeable for different runs.

The above-mentioned and other desirable objects are attained by the constructions, combinations, and arrangements of parts, as disclosed on the drawings, set forth in this specification, and succinctly pointed out in the appended claims.

With reference to the drawings filed herewith and bearing like reference characters for corresponding parts throughout, Figure 1 is a view in perspective, showing portions of an ordinary electric trolley-railway with a car on the track and one branch of the signaling apparatus installed. Fig. 2 is a view in elevation of the outer portion of a trolley-pole, showing the adjustable circuit-terminal mounted thereon and shows the terminal and sleeve for same in diametrical section. Fig. 3 is a plan view of the arm on which the terminal is mounted detached from the trolley-pole, and Fig. 4 is a side view of said terminal.

This signaling apparatus is disclosed in combination with the line-circuit of an ordinary electric street-railway of the trolley type, which includes tracks 5, composed of metallic rail-sections electrically connected in the ordinary manner, and overhead electric conductors or trolley-wires 6, connected with a dynamo or the like adapted to supply the electric energy for driving the rolling-stock.

Embodied with the railway proper are ordinary trolley-cars, as 7, which are supplied with the usual motors, and trolley-poles 8, of any desired or ordinary construction, which are electrically connected with the motors and are adapted to take the electric current from the trolley-wires in the usual manner for driving the motors and are therefore included in what we call the "line-circuit."

Carried by each trolley-pole 8 is a movable mounted circuit-terminal comprising a contact-collar 9, which is included in the signaling-circuit and is conveniently electrically connected with the trolley-pole, so as to be energized by the current in the line-circuit passing along the pole from the trolley-wire by means of a coil 11, composed of a section of wire of suitable length to allow for adjustment of the collar, so that it can be set for contact with either one of a plurality of stationary circuit-terminals, as contact-fingers 10, which are included in the signal-circuits and are mounted along the tracks at the point or points from which it is desired to signal, and these fingers are electrically connected with suitable visual and alarm signals, as low-voltage lamps 12 and a bell 14, arranged at the desired place for signaling the passing of the cars—as, for example, the despatcher's office. The contact-collars 9 are preferably annular in form and are slidably mounted on horizontally-disposed arms 15, which are secured to the trolley-poles 8 adjacent their outer extremities so as to project therefrom at right angles to the line of travel, and the stationary circuit-terminals or contact-fingers 10 comprise sections of resilient metal, as sheet-brass, which are placed side by side in vertical position and secured at one end in any desired manner to suitable overhead brackets 16 so that the opposite end portions will be free and lie at right angles to the line of travel and well across the paths of respective contact-collars. These contact-fingers are connected by respective wires 18 with independent resistance contrivances of suitable construction to materially reduce the voltage of the line-current which passes from the trolley-pole through the contact-collars to the fingers, and these resistance contrivances preferably consist of incandescent lamps, as 17, which are connected in independent series, one series for each finger, and are arranged on a suitable support as a board 19, mounted in close proximity to the fingers. The series of lamps 17 are electrically connected by respective wires 20 with respective signal-lamps 12, which carry globes of different colors, and wires 20', which lead from said signal-lamps to the alarm-bell 14, from which a ground-wire 22 leads the current for return through the rails and trolley-pole of the line-circuit, to complete the signal-circuits.

In the present instance the arms 15 are each formed with an eye 23 at one end of suitable size to receive the trolley-pole and are fastened in place by a pin or bolt passed through suitable apertures in the wall of the eye and the pole, and the arm is supported at the outer end by a suitable downwardly-extending diagonal brace 24, which is secured to the pole and arm. The contact-collar is formed with the upper portion of the periphery convex in cross-section, so that it will readily ride clear of the trolley-wire should the trolley-wheel run off, and the collar is conveniently insulated from the arm by means of a sleeve 25, which is composed of suitable insulating material and fits upon the arm and is rendered of suitable diameter to receive the collar freely, so that the collar can be readily adjusted relatively to the contact-fingers by slipping it along the sleeve, and a set-screw is mounted on the collar as suitable means for securing it in adjusted position.

In installing this apparatus in either a single or double track line for signaling as the cars pass both in and out the desired plurality of contact-fingers are mounted at each side of the roadway at the point or points from which it is desired to signal, so that the contact-collars on the trolley-poles will act on respective fingers at one side of the line as the cars go out and act on respective fingers at the opposite side of the line as the cars go in, and each contact-finger is electrically connected with the alarm or bell and with a respective visual signaling or indicating device, as a colored light in the despatcher's office, so that the car closing the signal-circuit will be made known by the color of the light. Thus the time of arrival and departure of the different cars at the outer terminus can be readily determined, while the use of the resistance contrivances in the signal-circuits render it possible to employ low-voltage signal devices and avoids the use of auxiliary circuits to energize the same, and by using the adjustable signal-circuit terminal on the cars they can be used interchangeably for different runs, as the terminal can be set for contact with any predetermined one of the stationary circuit-terminals.

As far as this invention is concerned other signal devices can be connected in the signal-circuit and the stationary circuit-terminals can be used in any required multiplicity and arranged at any desired point or points.

This apparatus is simple and inexpensive of construction and can be readily installed in connection with established electric lines without requiring any material alterations in the line-circuit or rolling-stock, it being simply necessary to install the signal-circuits and place the adjustable signal-circuit terminals on the rolling-stock.

Having thus described our invention, what we claim as new, and desire to secure by Letters Patent of the United States of America, is—

1. In electric signaling apparatus for electric railways; the combination of the line-circuit, a plurality of normally open signal-circuits having stationary circuit-terminals formed of resilient metallic strips arranged in close proximity to the roadway, and circuit-terminals adjustably mounted on the rolling-stock relatively to said stationary terminals and electrically connected with said line-circuit.

2. In electric signaling apparatus, for electric railways; the combination of the line-circuit, a plurality of normally open signal-circuits, stationary terminals connected with said signal-circuits and comprising depending resilient fingers arranged side by side in close proximity to the roadway and at right angles to the line of travel, and circuit-terminals mounted on the rolling-stock and adjustable at approximately right angles to said stationary terminals and electrically connected with said line-circuit.

3. In electric signaling apparatus for electric trolley-railways; the combination of the line-circuit, a plurality of normally open signal-circuits, stationary overhead terminals connected with said signal-circuits and comprising resilient fingers arranged side by side in close proximity to the roadway and at right angles to the line of travel, laterally-projecting arms secured to the trolley-poles of the rolling-stock, sleeves of insulating material on said arms, circuit-terminals comprising contact-collars slidably mounted on said arms for adjustment relatively to said fingers and electrically connected with said poles, and means to secure said collars in adjusted positions.

4. In electric signaling apparatus for electric trolley-railways; the combination of a trolley-pole, a laterally-projecting arm secured to said pole, and a signal-circuit terminal adjustably mounted on insulation on said arm and electrically connected with said pole.

5. In electric signaling apparatus for electric trolley-railways; the combination of a trolley-pole, a laterally-projecting arm secured to said pole, a sleeve on said arm composed of insulating material, and a signal-circuit terminal movably mounted on said sleeve and being adjustable thereon along the arm and electrically connected with said pole.

6. In electric signaling apparatus for electric trolley-railways; the combination of a trolley-pole, a laterally-projecting arm secured to said pole, a sleeve on said arm composed of insulating material, and a signal-circuit terminal comprising an annular contact-collar slidably mounted on said sleeve and electrically connected with said pole.

7. In electric signaling apparatus for electric trolley-railways; a signal-circuit terminal comprising an open annular-like body formed with a portion of its periphery convex as viewed in cross-section for engagement with a contact, substantially as described.

8. In combination with a trolley-pole, an outwardly-projecting arm mounted thereon, a sleeve of insulating material arranged on said arm, a contact adjustably mounted on said sleeve, and a circuit-wire connected with said contact.

9. In combination with a trolley-pole, an arm having its inner end formed with an eye through which the pole projects, means for supporting the arm on the pole, and a contact connected to a circuit-wire, said contact being mounted on said arm and insulated therefrom.

10. In an electric signaling apparatus for electric railways, the combination of the line-circuit, a plurality of normally open signal-circuits, a signal common to said circuits, an independent signal included in each respective circuit, circuit-terminals included in said last-named circuits, and a movable terminal connected with the line-circuit for contact with said first-named terminals.

Signed at Seattle, Washington, this 19th day of May, 1903.

GEORGE WASHINGTON WATKINS.
WALTER CHAPMAN BETHEL.

Witnesses:
JULIUS DAMUS,
C. J. WARNECKE.